United States Patent
Zhang et al.

(10) Patent No.: US 9,963,353 B2
(45) Date of Patent: May 8, 2018

(54) METHOD FOR RECOVERING ALKALI AND ALUMINUM IN COURSE OF TREATMENT OF BAYER RED MUD BY USING CALCIFICATION-CARBONATION METHOD

(71) Applicant: Northeastern University, Shenyang, Liaoning Province (CN)

(72) Inventors: Tingan Zhang, Shenyang (CN); Guozhi Lv, Shenyang (CN); Yan Liu, Shenyang (CN); Zimu Zhang, Shenyang (CN); Xiaofeng Zhu, Shenyang (CN); Zhihe Dou, Shenyang (CN)

(73) Assignee: NORTHEASTERN UNIVERSITY, Shenyang, Liaoning Province (CN)

( * ) Notice: Subject to any disclaimer, the term of this patent is extended or adjusted under 35 U.S.C. 154(b) by 0 days. days.

(21) Appl. No.: 15/303,408

(22) PCT Filed: Jul. 22, 2014

(86) PCT No.: PCT/CN2014/082676
§ 371 (c)(1),
(2) Date: Oct. 11, 2016

(87) PCT Pub. No.: WO2015/165153
PCT Pub. Date: Nov. 5, 2015

(65) Prior Publication Data
US 2017/0036920 A1 Feb. 9, 2017

(30) Foreign Application Priority Data
Apr. 30, 2014 (CN) .......................... 2014 1 0182568

(51) Int. Cl.
| | | |
|---|---|---|
| C01F 7/00 | (2006.01) | |
| C01F 7/47 | (2006.01) | |
| B09B 3/00 | (2006.01) | |
| C01D 1/04 | (2006.01) | |
| C01F 7/16 | (2006.01) | |
| C01F 7/20 | (2006.01) | |

(52) U.S. Cl.
CPC .................. C01F 7/47 (2013.01); B09B 3/00 (2013.01); C01D 1/04 (2013.01); C01F 7/16 (2013.01); C01F 7/20 (2013.01)

(58) Field of Classification Search
CPC ...... C01F 7/04; C01F 7/02; C01F 7/46; C01F 7/066; C01F 11/18; C01F 11/181; C01B 33/24; C01B 33/26; B09B 3/00
USPC ..... 423/118.1, 119, 159, 165, 123, 127, 331
See application file for complete search history.

(56) References Cited

U.S. PATENT DOCUMENTS

2015/0360966 A1* 12/2015 Krause .................... C01F 7/066
423/138

FOREIGN PATENT DOCUMENTS

| CN | 101318787 A | 12/2008 |
|---|---|---|
| CN | 101456572 A | 6/2009 |
| CN | 101580348 A | 11/2009 |
| CN | 101984080 A | 3/2011 |
| CN | 102757060 A | 10/2012 |

OTHER PUBLICATIONS

Translation of Guo et al, "Basic research on calcification . . . ", 17th (2013) National conference on metallurgical reaction engineering, pp. 413-419. (Year: 2013).*
Translation of Wang et al, "Influence of temperature on the reaction . . . " 17th (2013) National conference on metallurgical reaction engineering, pp. 408-12. (Year: 2013).*
CN-101984080A May 23, 2012, abstract. (Year: 2012).*
CN-101318787A Dec. 10, 2008, abstract. (Year: 2008).*
CN-101580348A Nov. 18, 2009, abstract. (Year: 2009).*
Wang, Yanxiu et al., "Influence of temperature on the reaction behavior of titanium's calcification in the transformation process of Calcification—Carbonization producting alumina", Essay collection of the 17th (2013 year) academic conference of the national metallurgical reaction engineering (first volume) Dec. 31, 2013 see the second and third sections, pp. 408-412.
Guo, Fangfang et al., "Basic research on calcificating to reduce alkaline of gibbsite's red mud in bayer process", Essay collection of the 17th (2013 year) academic conference of the national metallurgical reaction engineering (first volume), Dec. 31, 2013 see the 2.3th section and the third section, pp. 413-419.

* cited by examiner

*Primary Examiner* — Steven J Bos
(74) *Attorney, Agent, or Firm* — Muncy, Geissler, Olds & Lowe, P.C.

(57) ABSTRACT

A method for recovering alkali and aluminum during treatment of Bayer red mud using a calcification-carbonation method, including steps of mixing the Bayer red mud with calcium aluminate or with calcium aluminate and lime, performing calcification dealkalization conversion in a high-concentration alkaline liquor, and carbonizing the calcified residues produced during dealkalization to obtain carbonized residues; and then performing low-temperature aluminum dissolution, aluminum precipitation and the like to obtain calcium aluminate products, which is returned to the calcification dealkalization conversion of the red mud for recycling. Part of an alkali-containing and aluminum-containing liquid phase after calcification dealkalization conversion can be used as supplementary alkali in the Bayer production course for recycling. The method is energy-saving and environmentally-friendly, and allows recovering alkali and aluminum from the red mud and harmless treatment of the Bayer red mud.

6 Claims, No Drawings

METHOD FOR RECOVERING ALKALI AND ALUMINUM IN COURSE OF TREATMENT OF BAYER RED MUD BY USING CALCIFICATION-CARBONATION METHOD

TECHNICAL FIELD

The present invention relates to the field of environmental protection, in particular to a method for recovering alkali and aluminum in the course of treatment of Bayer red mud.

BACKGROUND OF THE INVENTION

Aluminum belongs to a mainstay industry of the non-ferrous metallurgical industry in China; by 2013, China's primary aluminum production capacity reached 18 million tons, with aluminum oxide production capacity close to 40 million tons, ranging the top in the world. At present, more than 80% of aluminum oxide in China is produced by using the Bayer method: the silicon-containing phase in bauxite can be converted to hydrated sodium aluminosilicate ($Na_2O.Al_2O_3.1.7SiO_2.nH_2O$) in aluminum oxide production with the Bayer method, namely, 1 kg of silicon oxide in minerals enable 1 kg of aluminum oxide to be removed from red mud and cause an loss of 0.608 kg of alkali. Containing alkali and aluminum, red mud has two problems: first, high content of the alkali makes the red mud not usable in cement and other bulk industries; second, during treatment of low-grade bauxites, the losses of aluminum oxide are too large, so that the overall yield is lower.

In order to achieve efficient utilization of the red mud and extraction of valuable elements, Chinese aluminum industry participants have been doing a lot of research and development work. The conventional utilization technologies for the red mud are generally divided into two types: one type is to use the red mud overall as a general industrial raw material, for example, in patent application numbered 200910303512 and titled "High-Volume Flyash Cement and Preparation Method thereof", invented by Zhang Kaiyuan et al., flyash, red mud, lime, cement clinker, gypsum and admixtures are used as raw materials, the red mud is dried, and then the dried red mud and the cement clinker are mixed and ground together; the lime and the gypsum are crushed; the admixtures are prepared into a solution; the flyash, the red mud, the lime, the cement clinker, the gypsum and the admixtures are uniformly mixed and finely ground to obtain the high-content flyash cement; and another example, in patent application numbered 200710105971 and titled "Process and Method for Completely Converting Aluminum Industrial Process Waste Residues into Ecological Building Materials" invented by Wang Wenju et al., the inherent substance properties of six kinds of waste residues generated in the production process of the aluminum industry—solid waste red mud (sintering method and Bayer method), boiler slags, beneficiation tailings, cinder, gas slag and sludge—are utilized to convert waste residues into novel road construction materials and building wall materials through processes of drying, crushing, reasonable proportioning, processing shaping (rolling & extrusion), solidifying or sintering.

The other type is to respectively extract valuable metal elements therein, in which the most typical manner is treating the Bayer red mud by a sintering method, or by an acid leaching method. For example, in the patent application numbered 201010561605 and titled "Process Method and Equipment for Separating Iron and Aluminum Silicon Residues and Removing Alkali Metal from Red Mud" invented by Dong Yafei et al., red mud, coal power, lime and adhesives are uniformly mixed in proportion so as to obtain a mixture, and the mixture is compressed to obtain granules; after drying, rotary hearth furnace smelting reduction, grinding and magnetic separation, iron and aluminum silicon residues are separated out; the separated iron is used for electric steel making or steel casting and the like, while the aluminum silicon residues are used for the production of high-grade and good-quality cement or as raw materials of refractory materials.

In the conventional technologies of using red mud, direct usages generally have problems of low product prices, low profits, and the like. Extracting valuable elements separately usually has problems of high energy consumption, high equipment requirements and the like during treatment. Thus, currently industrialized red mud is treated mostly by direct stockpiling. Although some aluminum oxide production enterprises dealkalize red mud and use the dealkalized red mud for cement and other industrial applications, there are two problems in direct dealkalization: first, when dealkalization is performed on the red mud with lime, only sodium oxide can be recovered; although the alkali content in red mud can be reduced to the level as required by the cement industry, since the products are monotonous, the overall benefit is low; second, low-concentration alkaline solutions produced after dealkalization of red mud in low-concentration alkaline solutions or clear water cannot be directly used and is required to be concentrated by evaporation, therefore the energy consumption is high.

SUMMARY OF THE INVENTION

In order to achieve better comprehensive utilization of valuable elements in red mud, and reduce energy consumption and cost in the treatment course, the present invention provides a method for recovering alkali and aluminum in the course of treatment of Bayer red mud by using a calcification-carbonation method. That is, Bayer red mud is used as raw material, and through the working procedures of calcification dealkalization conversion, carbonization conversion, low-temperature aluminum dissolution, aluminum precipitation and the like under high alkaline concentrations, alkali and aluminum in the red mud are recovered and harmless treatment of the Bayer red mud is realized.

To achieve the theses purposes, the technical scheme adopted by the present invention is as follows:
a method for recovering alkali and aluminum in the course of treatment of Bayer red mud by using a calcification-carbonation method, comprises the following steps of
(1) Calcification Dealkalization Conversion
mixing Bayer red mud with calcium aluminate or with calcium aluminate and lime, performing a calcification dealkalization conversion reaction in mother liquor of high-concentration caustic alkaline liquor, wherein the reaction temperature is 80-180° C., the reaction time is 10-60 min, so as to obtain mineral pulp; performing liquid-solid separation on the mineral pulp, wherein a solid phase is calcified residues, all the silicon-containing phase in the red mud is converted into hydrated garnet as the main component of the solid phase calcified residues, and a liquid phase is a high-concentration caustic alkaline solution; the main reaction of the calcification dealkalization conversion reaction is as follows:

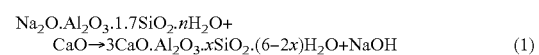

wherein, the mass ratio of calcium oxide in calcium aluminate or calcium oxide in lime and calcium aluminate to red mud is (0.2-1.0) to 1;

the mother liquor of the high-concentration caustic alkaline solution is a sodium hydroxide solution containing sodium oxide of which the concentration is 100-300 g/L, or a sodium aluminate solution containing sodium oxide of which the concentration is 100-300 g/L;

the liquid to solid ratio of the mother liquor of the high-concentration caustic alkaline solution to the red mud with the calcium aluminate or with the mixture of the lime and calcium aluminate is (3-10) to 1 mL/g.

after the calcification dealkalization conversion reaction, all sodium alkali of sodium aluminosilicate in the red mud enters the liquid phase, so that the concentration of sodium oxide in the reacted liquid-phase high-concentration caustic alkaline solution is increased; therefore, some of the high-concentration caustic alkaline solution can be taken to replenish alkali for the Bayer method or the low-temperature aluminum dissolution reaction described herein; at the same time, the aluminum oxide dissolved in the liquid phase during the calcification dealkalization conversion reaction is taken out according to a corresponding proportion, and enters a Bayer method system or the process flow of the present invention together with the taken caustic alkaline solution; the caustic alkaline solution without being taken can be recycled directly or by first being diluted with water produced via the process flow of the present invention as mother liquor of the high-concentration caustic alkaline solution in the calcification dealkalization conversion reaction in the step;

$V_{replenishing}/V_{total}$, which is a ratio of the volume ($V_{replenishing}$) of the high-concentration caustic alkaline solution which can be taken out to the volume ($V_{total}$) of the high-concentration caustic alkaline solution obtained after the calcification dealkalization conversion reaction, is associated with the concentration of the caustic alkaline solution before and the concentration of the caustic alkaline solution after the calcification dealkalization conversion reaction, and the specific calculation relationship is as follows:

$$\frac{V_{replenishing}}{V_{total}} = \frac{m_{after} - m_{before}}{m_{before}}$$

wherein, $V_{replenishing}$ is the volume of the high-concentration caustic alkaline solution which can be taken out, $V_{total}$ is the total volume of the high-concentration caustic alkaline solution after the calcification dealkalization conversion reaction, $m_{after}$ is the alkali concentration of the high-concentration caustic alkaline solution after the calcification dealkalization conversion reaction, and $m_{before}$ is the alkali concentration in the mother liquor of the high-concentration caustic alkaline solution before the calcification dealkalization conversion reaction;

a calcium source used in the calcification course is calcium aluminate or a mixture of the calcium aluminate and lime, and the degree of crystallization of calcium products is different from that of the calcification course using lime alone;

through the calcification dealkalization conversion reaction, the content of sodium oxide in the calcification residues is reduced to 1% or below;

(2) Carbonization Conversion mixing clear water with the calcified residues according to the liquid-solid ratio of the clear water to the calcified residues being (3-15) to 1 mL/g in a sealed container, filling the sealed container with $CO_2$, pressurizing the $CO_2$ first so that the partial pressure of $CO_2$ gas in the sealed container reaches 0.6-1.8 MPa, and then performing the carbonization conversion reaction for 10-240 min under the condition of 80-160° C. so as to obtain mineral pulp; and performing liquid-solid separation on the mineral pulp, wherein a solid phase is carbonization conversion residues containing main components of calcium silicate, calcium carbonate and aluminum hydroxide, and a liquid phase is water;

the main reaction of the carbonization conversion reaction is:

$$3CaO.Al_2O_3.xSiO_2.(6-2x)H_2O+(3-2x)CO_2 \rightarrow xCa_2SiO_4+(3-2x)CaCO_3+2Al(OH)_3+(3-2x)H_2O \quad (2)$$

water is used as a conversion medium and recycled in the carbonization conversion reaction of this step;

after the carbonation conversion reaction, most hydrated garnet in the calcified residues is converted into calcium silicate, calcium carbide and aluminum hydroxide entering carbonization conversion residues, and besides, the content of sodium oxide in the carbonization conversion residues is still 1% or below;

(3) Low-Temperature Aluminum Dissolution under a condition that the reaction temperature is 40-100° C. and the reaction time is 20-120 min, enabling the carbonization conversion residues obtained in the step (2) and low-temperature aluminum dissolution mother liquor containing sodium hydroxide of which the concentration is 50-150 g/L to be subjected to the aluminum dissolution reaction, so as to extract aluminum hydroxide in the carbonization conversion residues, wherein the liquid to solid ratio of the low-temperature aluminum dissolution mother liquor to the carbonization conversion residues is (4-15) to 1 mL/g, and through the reaction, mineral pulp is obtained; performing liquid-solid separation on the mineral pulp, wherein a solid phase is a novel-structure red mud comprising main components of calcium carbonate and calcium silicate, and a liquid phase is a sodium aluminate solution; the main aluminum dissolution reaction is as follows:

$$Al(OH)_3+NaOH=NaAl(OH)_4 \quad (3)$$

the carbonization conversion in the step (2) and low-temperature aluminum dissolution reaction in the step (3) can be performed 1 to 5 times, wherein, aluminum hydroxide for the low-temperature aluminum dissolution reaction can be from the high-concentration caustic alkaline solution obtained from the calcification conversion dissolution reaction of the step (1);

the novel-structure red mud is washed with water and can be used as raw materials for the cement industry, and the washing liquid resulting from washing can be returned to the calcification dealkalization conversion reaction of the step (1) to replenish the water loss due to replenishing alkaline liquor from the high-concentration caustic alkaline solution to the Bayer method or the low-temperature aluminum dissolution reaction of this step;

(4) Aluminum Precipitation enabling the sodium aluminate solution produced in the step (3) to react with calcium-containing minerals under a reaction condition that precipitation temperature is 20-90°

C. and the precipitation time is 1-60 min, wherein the mass ratio of calcium oxide in the calcium-containing mineral to the aluminium oxide in the solution is (1.3-2.5) to 1, so as to obtain calcium aluminate precipitates and a sodium hydroxide solution;

the calcium-containing minerals are raw materials containing calcium oxides including lime, calcium aluminate, carbide residues and the like;

the calcium aluminate precipitates from the reaction are returned to the step (1) to be recycled as a calcium source for the calcification dealkalization conversion reaction; the sodium hydroxide solution is returned to the step (3) to be recycled as mother liquor for low-temperature aluminum dissolution.

The present invention adopts the principles that: (a) after the calcification dealkalization conversion reaction of traditional red mud produced by the Bayer method and calcium aluminate or a mixture of the calcium aluminate and lime in the mother liquor of the high-concentration caustic alkaline solution, sodium alkali in the red mud enters the liquid phase, so as to obtain calcified residues and a higher-concentration caustic alkaline solution; therefore, in order to make full use of sodium alkali of the red mud in the process disclosed by the present invention, some caustic alkaline solution can be taken from the high-concentration caustic alkaline solution to replenish alkali for the Bayer method or the low-temperature aluminum dissolution reaction of the step (3) of the invention, and the remaining high-concentration caustic alkaline solution can be recycled directly as the mother liquor of the high-concentration caustic alkaline solution or recycled as the mother liquor of the high-concentration caustic alkaline solution after being diluted with the washing liquid from washing the novel-structure red mud of the step (3), in the calcification dealkalization conversion reaction of the step (1); (b) after the carbonation conversion reaction of the calcified residues and carbon dioxide in the water, carbonation conversion residues and water are obtained, wherein the water produced by the reaction can be recycled in the carbonation conversion reaction; (c) carbonation conversion residues and alkaline liquor are subjected to the low-temperature aluminum dissolution reaction so as to obtain tailings and dissolution liquid, wherein the alkaline liquor for the reaction is from the alkaline liquor taken after the calcification dealkalization conversion reaction of the step (1) and the alkaline liquor obtained from aluminum precipitation of the step (4); the tailings obtained from the reaction are washed with water and discharged out as a cement material, while the washing water can be returned to the calcification dealkalization conversion reaction of the step (1) to replenish the high-concentration caustic alkaline solution for water loss caused by taking out of alkaline liquor; and (d) the dissolution liquor reacts with calcium-containing minerals to obtain calcium aluminate precipitates and a sodium hydroxide solution, wherein the calcium aluminate precipitates are returned to the step (1) to be recycled as a calcium source for the calcification dealkalization conversion reaction, while the sodium hydroxide solution is returned to the step (3) to be participated in the low-temperature aluminum dissolution reaction. Through the entire process flow of the present invention, the red mud is fully used, namely most of the alkali and aluminum oxide in the red mud are extracted for use, the high-concentration caustic alkaline mother liquor and water are recycled in the whole process, and only the tailings are finally discharged, the tailings have main components of calcium silicate and calcium carbonate, which can be directly used in the cement industry, and the entire process is low in energy consumption.

Compared with the prior art, the method disclosed by the present invention has the following characteristics and beneficial effects:

(1) according to the method, the red mud can be fully utilized, no waste is produced in the course of the process, and multiple materials in the process can be recycled.

(2) the red mud is treated by the method disclosed by the invention, so that not only can sodium oxide be recovered, but also aluminum oxide can be recovered, and the overall yield is high;

(3) according to the method, the high-concentration alkaline solution is used to perform calcification conversion dealkalization treatment on the red mud, and the alkaline solution produced after dealkalization of the red mud has a high concentration and can be directly used for replenishing alkali for the Bayer method as well as the low-temperature aluminum dissolution reaction disclosed in the present invention; concentrating by evaporation is not needed, so that the energy consumption is low.

(4) the tailings obtained by the production method disclosed by the present invention, comprising main components of calcium silicate and calcium carbonate, can be directly used in the cement industry, so that harmless utilization of the red mud in the production course of aluminium oxide can be realized;

(5) according to the production method disclosed by the present invention, a wet method is mainly used in the whole flow, so that the energy consumption is low;

(6) according to the red mud treated by the production method disclosed by the present invention, the overall yield of aluminium oxide in minerals can reach 85%-100%, the aluminum-silicon ratio of dissolution residues can be reduced to 0.4 or less, the content of sodium alkali can also be reduced to 0.5% or less, the extraction rate of aluminium oxide in minerals can be increased by 15% or above than the Bayer method, and ore consumption for producing one ton of aluminium oxide can be reduced by about 20%.

DETAILED DESCRIPTION OF THE INVENTION

The red mud used by the embodiments of the present invention comprises the following components in percentage by mass: 18.15% of $Al_2O_3$, 17.17% of $SiO_2$, 6.73% of $Na_2O$, 25.14% of $Fe_2O_3$, and the balance being water, $TiO_2$ and other impurities;

according to the embodiments of the present invention, 100 tons (t) of red mud is treated every time according to the embodiments of the present invention, the amount of added lime by content of calcium oxide, accounts for 75% of the total mass;

according to the embodiments of the present invention, the $CO_2$ gas used is $CO_2$ waste gas generated during the firing of lime, but the production course used for the method disclosed by the invention is not limited to the use of such gas, and any gas containing $CO_2$ can be used as a raw material for the carbonization conversion course;

the lime adopted by the method disclosed by the present invention is made from firing quicklime, but the calcification raw materials for aluminum precipitation is not limited to fired lime, but can comprise any materials containing calcium oxide as a main component.

Embodiment 1

Mixing Bayer red mud with lime and calcium aluminate, performing a calcification dealkalization conversion reaction in high-concentration sodium hydroxide mother liquor containing sodium oxide of which the concentration is 300 g/L, and using the lime and calcium aluminate as the calcium source, wherein the calcium aluminate dosage is 38.63 t, the lime dosage is 83.16 t, the mass ratio of the total mass of calcium oxide contained in calcium aluminate and lime to the red mud is 1 to 1, the liquid to solid ratio of the sodium hydroxide mother liquor to the mixture of the red mud, lime and calcium aluminate is 3 to 1 ml/g, the reaction temperature is 180° C. and the reaction time is 60 min, liquid-solid separation is performed on mineral pulp after conversion of the red mud, a solid phase is calcified residues, all the silicon-containing phase in the red mud is converted into hydrated garnet entering the solid phase calcified residues, and a liquid phase is a high-concentration sodium hydroxide solution containing aluminium oxide, 3% by volume of the high-concentration sodium hydroxide solution after the conversion reaction is taken out and returned to replenish alkali for the Bayer method, and the remaining high-concentration sodium hydroxide solution is recycled as mother liquor during the calcification conversion reaction; enabling the aluminum oxide dissolved in the liquid phase during the conversion reaction to enter the Bayer method system proportionately with the taken out high-concentrations sodium hydroxide solution;

mixing clear water with the calcified residues by the liquid-solid ratio of the clear water to the calcified residues being 5 to 1 mL/g in a sealed container, and filling the sealed container with $CO_2$, pressurizing the $CO_2$ at first so that the partial pressure of $CO_2$ gas in the sealed container reaches 1.8 MPa; then performing a carbonization conversion reaction for 180 min under a condition of 120° C. so as to obtain clear water and carbonization conversion residues containing main components of calcium silicate, calcium carbonate and aluminum hydroxide, wherein the clear water is recycled in the carbonization conversion reaction;

extracting aluminum hydroxide from carbonization residues with a low-temperature aluminum dissolution mother liquor containing sodium hydroxide of which the concentration is 150 g/L under a condition that aluminum dissolution temperature is 100° C. and the aluminum dissolution time is 20 min, wherein the liquid to solid ratio of the low-temperature aluminum dissolution mother liquor to the carbonization residues is 10 to 1 mL/g, so as to obtain novel-structure red mud comprising main components of calcium carbonate and calcium silicate, and a sodium aluminate solution;

repeating the carbonization conversion reaction and low-temperature aluminum dissolution reaction 3 times;

treating the sodium aluminate solution obtained after performing the carbonization conversion reaction and the low-temperature aluminum dissolution reaction 3 times with lime for aluminum precipitation, wherein the mass ratio of the amount of calcium oxide in the lime to aluminium oxide in the solution is 2.5 to 1, and under a condition that the precipitation temperature is 90° C. and the reaction time is 1 min, obtaining 38.63 t of precipitated calcium aluminate and a sodium hydroxide solution; enabling the calcium aluminate to be returned to the dealkalization conversion course to be used as a calcium source; and enabling the sodium hydroxide solution to be returned to the low-temperature aluminum dissolution process to be used as mother liquor for low-temperature aluminum dissolution.

In the obtained tailings, the mass ratio of aluminium oxide to silicon oxide is 0.45 to 1, and the content of sodium oxide is 0.5%.

Embodiment 2

Mixing Bayer red mud with calcium aluminate, performing a calcification dealkalization conversion reaction in a sodium hydroxide mother liquor containing sodium oxide of which the concentration is 100 g/L, and using calcium aluminate as the calcium source, wherein the calcium aluminate dosage is 83 t, the mass ratio of the total mass of calcium oxide contained in calcium aluminate to the red mud is 0.4 to 1, the liquid to solid ratio of the sodium hydroxide mother liquor to the mixture of the red mud and calcium aluminate is 5 to 1 ml/g, the reaction temperature is 80° C. and the reaction time is 10 min, so as to obtain mineral pulp after the reaction, liquid-solid separation is performed on the mineral pulp, a solid phase is calcified residues, all the silicon-containing phase in the red mud is converted into hydrated garnet entering the solid phase calcified residues, and a liquid phase is a high-concentration sodium hydroxide solution containing aluminium oxide, 11.5% by volume of the high-concentration sodium hydroxide solution after the conversion reaction is taken out and returned to replenish alkali for the Bayer method, and the remaining high-concentration sodium hydroxide solution is recycled as mother liquor during the calcification conversion reaction; enabling the aluminum oxide dissolved in the liquid phase during the conversion reaction to enter the Bayer method system proportionately with the taken out high-concentrations sodium hydroxide solution;

mixing clear water with the calcified residues according to the liquid-solid ratio of the clear water to the calcified residues being 15 to 1 mL/g in a sealed container, and filling the sealed container with $CO_2$, pressurizing the $CO_2$ at first so that the partial pressure of $CO_2$ gas in the sealed container reaches 0.8 MPa; then performing a carbonization conversion reaction for 10 min under a condition of 160° C. so as to obtain clear water and carbonization conversion residues containing main components of calcium silicate, calcium carbonate and aluminum hydroxide; enabling the clear water to be recycled in the carbonization conversion reaction;

extracting aluminum hydroxide from the carbonization residues with a low-temperature aluminum dissolution mother liquor containing sodium hydroxide of which the concentration is 50 g/L under a condition that the aluminum dissolution temperature is 100° C. and the aluminum dissolution time is 120 min, wherein the liquid to solid ratio of the low-temperature aluminum dissolution mother liquor to the carbonization residues is 4 to 1 mL/g, so as to obtain a sodium aluminate solution and a novel-structure red mud comprising main components of calcium carbonate and calcium silicate, wherein the novel-structure red mud washed with water can be used as raw materials for the cement industry, and the washing liquid resulting from washing can be added to the mother liquor of the calcification dealkalization conversion reaction to replenish the water loss caused by taking out of the alkaline solution;

treating the liquid phase sodium aluminate solution obtained after the low-temperature aluminum dissolution reaction with lime for aluminum precipitation, wherein the mass ratio of the amount of calcium oxide in the lime to aluminium oxide in the solution is 1.3 to 1, and under a condition that the precipitation temperature is 20° C. and the reaction time is 60 min, obtaining 44.35 t of precipitated calcium aluminate and a sodium hydroxide solution; enabling the calcium aluminate to be returned to the dealkalization conversion course to be used as a calcium source; and enabling the sodium hydroxide solution to be returned to the low-temperature aluminum dissolution process as a mother liquor for low-temperature aluminum dissolution.

In the obtained tailings, the mass ratio of aluminium oxide to silicon oxide is 0.36 to 1, and the content of sodium oxide is 0.3%.

Embodiment 3

Mixing Bayer red mud with lime and calcium aluminate, performing a calcification dealkalization conversion reaction in high-concentration sodium hydroxide mother liquor with the sodium oxide of which the concentration is 240 g/L, and using the lime and calcium aluminate as the calcium source, wherein the calcium aluminate dosage is 39.4 t, the lime dosage is 43.3 t, the mass ratio of the total mass of calcium oxide contained in calcium aluminate and lime to the red mud is 0.5 to 1, the liquid to solid ratio of the sodium hydroxide mother liquor to the mixture of the red mud, lime and calcium aluminate is 7 to 1 ml/g, the conversion temperature is at 120° C., the conversion time is 60 min, after conversion, a solid phase is calcified residues, all the silicon-containing phase in the red mud being converted into hydrated garnet entering the solid phase calcified residues, and a liquid phase is a high-concentration sodium hydroxide solution containing aluminium oxide, 5% by volume of the high-concentration sodium hydroxide solution after the conversion reaction is taken out and returned to replenish alkali for the Bayer method, while the remaining high-concentration sodium hydroxide solution is recycled as mother liquor during the calcification conversion reaction; enabling the aluminum oxide dissolved in the liquid phase during the conversion reaction to enter the Bayer method system proportionately with the taken out high-concentrations sodium hydroxide solution;

mixing clear water and the calcified residues by the liquid-solid ratio of the clear water to the calcified residues being 10 to 1 mL/g in a sealed container, and filling the sealed container with $CO_2$, pressurizing the $CO_2$ at first so that the partial pressure of $CO_2$ gas in the sealed container reaches 1.2 MPa; then performing a carbonization conversion reaction under a condition of 80° C. for 240 min so as to obtain clear water and carbonization conversion residues containing main components of calcium silicate, calcium carbonate and aluminum hydroxide; enabling the clear water to be recycled in the carbonization conversion reaction;

extracting aluminum hydroxide from the carbonization residues with a low-temperature aluminum dissolution mother liquor containing sodium hydroxide of which the concentration is 100 g/L under a condition that the aluminum dissolution temperature is 40° C. and the aluminum dissolution time is 120 min, wherein the liquid to solid ratio of the low-temperature aluminum dissolution mother liquor to the carbonization residues is 15 to 1 mL/g, so as to obtain a sodium aluminate solution and a novel-structure red mud comprising main components of calcium carbonate and calcium silicate, the novel-structure red mud washed with water can be used as raw materials for the cement industry, and the washing liquid resulting from washing can be used for the calcification dealkalization conversion reaction to replenish the water loss caused by taking out of the sodium hydroxide solution;

treating the liquid phase sodium aluminate solution obtained after the low-temperature aluminum dissolution reaction with lime for aluminum precipitation, wherein the mass ratio of the amount of calcium oxide in the lime to aluminium oxide in the solution is 2 to 1, and under a condition that the precipitation temperature is 60° C. and the reaction time is 25 min, obtaining 39.4 t of precipitated calcium aluminate and a sodium hydroxide solution; enabling the calcium aluminate to be returned to the dealkalization conversion course as a calcium source; and enabling the sodium hydroxide solution to be returned to the low-temperature aluminum dissolution process as a mother liquor for low-temperature aluminum dissolution.

In the obtained tailings, the mass ratio of aluminium oxide to silicon oxide is 0.438 to 1, and the content of sodium oxide is 0.35%.

Embodiment 4

Mixing Bayer red mud with lime and calcium aluminate, performing a calcification dealkalization conversion reaction in a sodium aluminate solution of which the concentration is 200 g/L, and using the lime and calcium aluminate as the calcium source, wherein the calcium aluminate dosage is 35.44 t, the lime dosage is 5.66 t, the mass ratio of the total mass of calcium oxide contained in calcium aluminate and lime to the red mud is 0.2 to 1, the liquid to solid ratio of the sodium hydroxide mother liquor to the mixture of the red mud, lime and calcium aluminate is 10 to 1 ml/g, the conversion temperature is 120° C., the conversion time is 30 min, after conversion, a solid phase is calcified residues, all the silicon-containing phase in the red mud is converted into hydrated garnet entering the solid phase calcified residues, and a liquid phase is a high-concentration sodium hydroxide solution containing sodium aluminate, 6% by volume of the high-concentration sodium hydroxide solution after the conversion reaction is taken out for the subsequent low-temperature aluminum dissolution reaction, and the remaining high-concentration sodium hydroxide solution is recycled during the calcification conversion reaction; enabling the aluminum oxide dissolved in the liquid phase during the conversion reaction to enter the subsequent low-temperature aluminum dissolution reaction proportionately with the taken out high-concentrations sodium hydroxide solution;

mixing clear water and the calcified residues according to the liquid-solid ratio of the clear water to the calcified residues being 3 to 1 mL/g in a sealed container, filling the sealed container with $CO_2$, pressurizing the $CO_2$ at first so that the partial pressure of $CO_2$ gas in the sealed container reaches 1.2 MPa, then performing a carbonization conversion reaction for 60 min under a condition of 100° C. so as to obtain clear water and carbonization conversion residues containing main components of calcium silicate, calcium carbonate and aluminum hydroxide; enabling the clear water to be recycled in the carbonization conversion reaction;

extracting aluminum hydroxide from the carbonization residues with a low-temperature aluminum dissolution mother liquor containing sodium hydroxide of which the concentration is 100 g/L under a condition that the aluminum dissolution temperature is 60° C. and the aluminum dissolution time is 90 min, wherein the liquid to solid ratio of the low-temperature aluminum dissolution mother liquor to the carbonization residues is 8 to 1 mL/g, so as to obtain a sodium aluminate solution and a novel-structure red mud comprising main components of calcium carbonate and calcium silicate, the novel-structure red mud washed with water can be used as raw materials for the cement industry, and the washing liquid resulting from washing can be used for the calcification dealkalization conversion reaction to replenish the water loss caused by taking out of the sodium hydroxide solution;

treating the liquid phase obtained after the low-temperature aluminum dissolution reaction with lime for aluminum precipitation, wherein the mass ratio of the amount of calcium oxide in the lime to aluminium oxide in the solution is 1.8 to 1, and under a condition that the precipitation temperature is 60° C. and the reaction time is 25 min, obtaining 35.44 t of precipitated calcium aluminate and a sodium hydroxide solution; enabling the calcium aluminate to be returned to the dealkalization conversion course to be used as a calcium source; and enabling the sodium hydroxide solution to be returned to the low-temperature aluminum dissolution course as mother liquor for the low-temperature aluminum dissolution.

In the obtained tailings, the mass ratio of aluminium oxide to silicon oxide is 0.50 to 1, and the content of sodium oxide is 0.82%.

Embodiment 5

Mixing Bayer red mud with lime and calcium aluminate, performing a calcification dealkalization conversion reaction in a sodium aluminate solution containing sodium oxide of which the concentration is 260 g/L, and using the lime and calcium aluminate as the calcium source, wherein the calcium aluminate dosage is 43.71 t, the lime dosage is 80.76 t, the mass ratio of the total mass of calcium oxide contained in calcium aluminate and lime to the red mud is 0.8 to 1, the liquid to solid ratio of the sodium hydroxide mother liquor to the mixture of the red mud, lime and calcium aluminate is 8 to 1 ml/g, the conversion temperature is 130° C. and the conversion time is 30 min, after conversion, a solid phase is calcified residues, all the silicon-containing phase in the red mud being converted into hydrated garnet entering the solid phase calcified residues, and a liquid phase is a high-concentration sodium hydroxide solution containing sodium aluminate, 4.5% by volume of the high-concentration sodium hydroxide solution after the conversion reaction is taken out for the subsequent low-temperature aluminum dissolution reaction, and the remaining high-concentration sodium hydroxide solution is recycled during the calcification conversion reaction; enabling the aluminum oxide dissolved in the liquid phase during the conversion reaction to enter the subsequent low-temperature aluminum dissolution reaction proportionately with the taken out high-concentrations sodium hydroxide solution;

mixing clear water and the calcified residues according to the liquid-solid ratio of the clear water to the calcium being 5 to 1 mL/g in a sealed container, and filling the sealed container with $CO_2$, pressurizing the $CO_2$ at first so that the partial pressure of $CO_2$ gas in the sealed container reaches 1.0 MPa; then enabling a carbonization conversion reaction for 100 min under a condition of 140° C. so as to obtain clear water and carbonization conversion residues containing main components of calcium silicate, calcium carbonate and aluminum hydroxide; enabling the clear water to be recycled in the carbonization conversion reaction;

extracting aluminum hydroxide from carbonization conversion residues with a low-temperature aluminum dissolution mother liquor containing sodium hydroxide of which the concentration is 100 g/L under a condition that aluminum dissolution temperature is 70° C. and the aluminum dissolution time is 60 min, wherein the liquid to solid ratio of the low-temperature aluminum dissolution mother liquor to the carbonization residues is 12 to 1 mL/g, so as to obtain a sodium aluminate solution and a novel-structure red mud comprising main components of calcium carbonate and calcium silicate;

repeating the carbonization conversion reaction and the low-temperature aluminum dissolution reaction 5 times;

treating the sodium aluminate solution obtained after 5 times of carbonization conversion reaction and low-temperature aluminum dissolution reaction with lime for aluminum precipitation, wherein the mass ratio of the amount of calcium oxide in the lime to aluminium oxide in the solution being 2 to 1, and under a condition that the precipitation temperature is 60° C. and the reaction time is 5 min, obtaining 43.71 t of precipitated calcium aluminate and a sodium hydroxide solution; enabling the calcium aluminate to be returned to the dealkalization conversion course to be used as a calcium source; and enabling the sodium hydroxide solution to be returned to the low-temperature aluminum dissolution course as a mother liquor for low-temperature aluminum dissolution.

In the obtained tailings, the mass ratio of aluminium oxide to silicon oxide is 0.37 to 1, and the content of sodium oxide is 0.4%.

What is claimed is:

1. A method for recovering alkali and aluminum in the course of treatment of Bayer red mud by using a calcification-carbonation method, the method comprising the following steps of Step (1):

mixing the Bayer red mud with calcium aluminate or with calcium aluminate and lime, and performing a calcification dealkalization conversion reaction in mother liquor of a high-concentration caustic alkaline solution, wherein the reaction temperature is 80-180° C. and the reaction time is 10-60 min, to form a solid phase of calcified residues of which the main component is hydrated garnet, and a liquid phase of the high-concentration caustic alkaline solution;

Step (2):

mixing clear water with the calcified residues at a liquid-solid amount of 3-15 ml clear water per 1 g calcified residues in a sealed container, and filling the sealed container with $CO_2$, so that the partial pressure of $CO_2$ gas in the sealed container reaches 0.8-1.8 MPa; then performing a carbonization conversion reaction at 80-160° C. for 10-240 min to obtain a mineral pulp; and performing liquid-solid separation on the mineral pulp to obtain a solid phase of carbonization converted residues of which the main components are calcium silicate, calcium carbonate and aluminum hydroxide, and a liquid phase of water which is then recycled;

Step (3): under a reaction temperature of 40-100° C. and a reaction time of 20-120 min, enabling the carbonization converted residues and a low-temperature aluminum dissolution mother liquor containing sodium hydroxide of which the concentration is 50-150 g/L to be subjected to an aluminum dissolution reaction, wherein the liquid to solid amount is 4-15 mL of the low-temperature aluminum dissolution mother liquor per 1 g of the carbonization converted residues, so as to obtain a mineral pulp; performing liquid-solid separation on the mineral pulp to obtain a liquid phase of a sodium aluminate solution, and a solid phase of a novel-structure red mud of which the main components are calcium carbonate and calcium silicate;

performing step (2) and step (3) 1 to 5 times; and washing the novel-structure red mud with water, and then discharging the washed red mud, wherein the washing liquid resulting from washing is returned to step (1) to be used for replenishing the water loss due to replenishing alkaline liquor from the high-concentration caustic alkaline solution for a Bayer method or step (3); and Step (4):

enabling the sodium aluminate solution produced in step (3) to react with calcium-containing minerals so as to obtain calcium aluminate precipitates and a sodium hydroxide solution;

enabling the calcium aluminate precipitates from the reaction to be returned to step (1) to be recycled as a calcium source for the calcification dealkalization conversion reaction; and enabling the sodium hydroxide solution to be returned to the step (3) to be recycled as mother liquor for low-temperature aluminum dissolution, wherein, part of alkaline liquor is taken from the high-concentration caustic alkaline solution obtained in step (1) to replenish alkali for the Bayer method or step (3), and the alkaline liquor without being taken is recycled as the mother liquor of step (1).

2. The method according to claim 1, wherein, the mass ratio of the calcium oxide in the calcium aluminate or the lime and the calcium aluminate to the red mud in step (1) is (0.2-1.0) to 1; and the liquid to solid amount is 3-10 mL of the mother liquor of the high-concentration caustic alkaline solution per 1 g of the red mud with the calcium aluminate or with a mixture of the lime and the calcium aluminate.

3. The method according to claim 1, wherein, the mother liquor of the high-concentration caustic alkaline solution in step (1) is a sodium hydroxide solution containing sodium oxide of which the concentration is 100-300 g/L, or a sodium aluminate solution containing sodium oxide of which the concentration is 100-300 g/L.

4. The method according to claim 1, wherein, $V_{replenishing}/V_{total}$, which is a ratio of the volume ($V_{replenishing}$) of the high-concentration caustic alkaline solution which is taken out to the volume ($V_{total}$) of the high-concentration caustic alkaline solution obtained after the calcification dealkalization conversion reaction, is associated with the concentrations of the caustic alkaline solutions before and after the calcification dealkalization conversion reaction, and the specific calculation relationship is as follows:

$$\frac{V_{replenishing}}{V_{total}} = \frac{m_{after} - m_{before}}{m_{before}}$$

wherein, $V_{replenishing}$ is the volume of the high-concentration caustic alkaline solution which is taken out, $V_{total}$ is the total volume of the high-concentration caustic alkaline solution after the calcification dealkalization conversion reaction, $m_{after}$ is the concentration of the caustic alkaline solution in the liquid phase after the calcification dealkalization conversion reaction, and $m_{before}$ is the concentration of the caustic alkaline solution in the liquid phase before the calcification dealkalization conversion reaction.

5. The method according to claim 1, wherein, the calcium-containing minerals in step (4) are raw materials containing calcium oxides including lime, calcium aluminate and carbide residues; and the mass ratio of the calcium oxide in the calcium-containing mineral to the aluminium oxide in the sodium aluminate solution is (1.3-2.5) to 1.

6. The method according to claim 1, wherein, the calcium-containing minerals and the sodium aluminate solution in step (4) react under a condition that the reaction temperature is 20-90° C. and the reaction time is 1-60 min.

* * * * *